United States Patent [19]
Hong et al.

[11] Patent Number: 6,134,558
[45] Date of Patent: Oct. 17, 2000

[54] REFERENCES THAT INDICATE WHERE GLOBAL DATABASE OBJECTS RESIDE

[75] Inventors: Chin-Heng Hong, Hillsborough; Sudheer Thakur, Belmont; Anil Nori, Fremont; Joyo Wijaya, Menlo Park, all of Calif.

[73] Assignee: Oracle Corporation, Redwood Shores, Calif.

[21] Appl. No.: 08/961,740

[22] Filed: Oct. 31, 1997

[51] Int. Cl.⁷ .................................................. G06F 17/30
[52] U.S. Cl. ........................... 707/103; 707/10; 707/101; 707/102
[58] Field of Search .................................. 707/103, 101, 707/102, 3, 10

[56] References Cited

U.S. PATENT DOCUMENTS

| | | | |
|---|---|---|---|
| 5,261,098 | 11/1993 | Katin et al. | 707/1 |
| 5,551,027 | 8/1996 | Choy et al. | 707/201 |
| 5,560,005 | 9/1996 | Hoover et al. | 707/10 |
| 5,581,758 | 12/1996 | Burnett et al. | 707/103 |
| 5,594,899 | 1/1997 | Kundsen et al. | 707/2 |
| 5,724,575 | 3/1998 | Hoover et al. | 707/10 |
| 5,729,730 | 3/1998 | Wlaschin et al. | 707/3 |
| 5,978,791 | 11/1999 | Farber et al. | 707/2 |

Primary Examiner—Jean R. Homere
Attorney, Agent, or Firm—Hickman Palermo Truong & Becker, LLP; Brian D. Hickman; Marcel K. Bingham

[57] ABSTRACT

A method and apparatus for generating references to a set of objects which reside in a plurality databases is described. Each object is associated with a table from a plurality of tables that are contained in the plurality of databases. An object id is associated with each object; the object id uniquely identifies the object relative to the objects in the set of objects. A table id is associated with each table; the table id uniquely identifies the table relative to tables in the plurality of tables. A table containing an object is located based on the table id associated with the table, and the object is located in the table based on the object id associated with the object. A table mapping is generated. The table mapping maps a set of tables to databases associated with the set of tables. The set of tables are from the plurality of tables. References to objects from the set of object are generated. Each reference comprises data that identifies an object. The reference contains data representing the object id of the referenced object, the object referred to by the reference. The reference also contains data representing the table id of the table containing the referenced object. An object is located based on the table mapping and the reference referring to the object. The table containing the object is located based on the data in the reference, the data representing the table id associated with the table containing the object.

43 Claims, 10 Drawing Sheets

Fig. 3A

Create Type OT_STATE As Object (

Name      VARCHAR (30),
    Abbr       VARCHAR (2));

Fig. 3B

Table STATE     <TID 998>

| OID | Name | Abbr |
|---|---|---|
| 200,000 | Alabama | AL |
| 200,000 | California | CA |
|  |  |  |
|  |  |  |

Creale Type    OT_PERSON As Object (

NAME     VARCHAR2 (20),
                SSN      VARCHAR2 (11),
                STATE    REF ADT_ STATE));

*Fig. 3D*

Table EMPLOYEE < TID 999>

| OID | Name | SSN | State |
|---|---|---|---|
| 000000 | John Doe | 999-99-9999 | Reference to an object in STATE |
| 000001 | Jane Doe | 999-99-9998 | Reference to an object in STATE |
|  |  |  |  |
|  |  |  |  |

FORMER-EMPLOYEE Table Definition

Create Table FORMER EMPLOYEE (

NAME    VARCHAR (20),
    SSN     VARCHAR (11),
    STATE   VARCHAR (2));

Fig. 3F

Table FORMER_EMPLOYEE

| Name | SSN | State |
|---|---|---|
| Frank Doe | 999-99-9999 | CA |
| Jane Doe | 999-99-9998 | CA |
| | | |
| | | |

Fig. 3G

Create Type OT_ARCHIVED_EMPLOYEE As Object ( (NAME    VARCHARZ (20),
    SSN     VARCHARZ (11));

Fig. 3H

TABLE EMPLOYEE-ARCHIVE

| OID | Name | SSN |
|---|---|---|
| 004000 | Archive, Jane | 999-99-9991 |
| 004001 | Archive, John | 999-99-9992 |
| | | |
| | | |

Fig. 4A

Create Type ADT_F EMPLOYEE As Object (
        NAME    VARCHAR2 (20),
        SSN     VARCHAR2 (11));

Fig. 4B

<TID 800>

Create View FEMPLOYEE of ADT_FEMPLOYEE

With  OID (SSN)
Select    NAME,
           FORMER_EMPLOYEE.SSN
From     FORMER_EMPLOYEE/;

Global TABLE MAP

| TID | Database Descriptor |
|---|---|
| | 504 |

Local TABLE MAP

| TID | Local Table Descriptor |
|---|---|
| | 554 |

Fig. 5

610 — Row ID Flag | Key based OID flag | OLength | OID | TID | Row-ID

630 — R Lengths | Row-ID flag | Key-based Flag | OID "000000" | TID "999" | Row-ID "0"

Fig. 6

REFERENCES THAT INDICATE WHERE GLOBAL DATABASE OBJECTS RESIDE

FIELD OF THE INVENTION

The invention relates to object-relational databases, and in particular, methods of referring to objects contained in object-relational databases.

BACKGROUND OF THE INVENTION

In an object-relational database, the world can be modeled using a type system fundamentally based on object types. An object type is associated with one or more attributes and zero or more methods. Instances of object types are known as "objects". Each object contains values for its attributes. The values of the attributes are collectively referred to as the object's state. Each object that is an instance of a particular object type has the same attributes. The methods associated with an object (i.e. methods associated with the object type of the object) operate upon the state of an object.

Object tables are tables that contain objects. Each object in an object table belongs to the same object type. More than one table may contain objects of a particular object type. For example, the tables FRIENDS and EMPLOYEES may both contain objects of the object type PERSON. Each row of data in a table stores the state of an object. Each column of an object table corresponds to an attribute of the objects contained in the object table.

For example, an object type called PERSON may define several attributes for objects which represent employees. Assume one attribute is NAME and another is SOCIAL SECURITY NUMBER. Further assume that an object table, EMPLOYEE, contains objects belonging to PERSON. One column in EMPLOYEE corresponds to the NAME attribute, another column corresponds to the SOCIAL SECURITY NUMBER attribute.

Each row in EMPLOYEE contains the state of one object. One row, for example, contains data for the object representing one employee with a NAME value of "John Doe" and having a SOCIAL SECURITY NUMBER value of "999-99-9999". One column in the row contains the value for the NAME attribute, and another column would contain the value for the SOCIAL SECURITY NUMBER attribute.

Objects may themselves be attributes of other objects. Consequently, a single object may appear at multiple places within a database. For example, the person object type may have a "children" attribute, where the children attribute is defined as a collection of person objects. Thus, assuming that a person X is the child of persons Y and Z, the object for person X may exist as a separate "person" object, as a component of the person Y object, and as a component of the person Z object.

It is inefficient to store multiple copies of an object at different places in an object-relational system. Therefore, separate copies of objects are typically not stored in the attribute portions of objects of which they are attributes. Instead, the attributes store data that identify objects, but not the objects themselves. Data that identifies an object is referred to as a "reference" to the object, and typically includes information that is used to locate the object.

In programming languages used with object-relational databases, such as PL/SQL™, it is desirable to provide users a mechanism for creating references to objects. For example, consider the following PL/SQL™ code fragment representing a declaration of a variable containing a reference.

DECLARE empref REF EMPLOYEE;

The code fragment declares the variable empref to be a reference to an object belonging to the object type EMPLOYEE. In response to this declaration, memory is allocated for storing a reference to an object belonging to EMPLOYEE. The data stored in that memory identifies a specific EMPLOYEE object and may be used to locate the EMPLOYEE object so that the object may be accessed.

One technique for generating references is referred to herein as the "object id" technique. In the object id technique, an object id is generated for and assigned to each object. An object id is a descriptor that uniquely, for all practical purposes, identifies an object. In an object-oriented database, such as the Oracle8 Database Server™, an object id is generated whenever an object is created in the database. Each reference to an object includes the object id for the object. When a reference is used to access an object, the object id is used to search the database for the object that has been assigned that object id.

One disadvantage suffered by the object id method is that every object table in a database must be examined for the object identified by the object id, until the sought object is found. Examining every object table until the sought object is found creates an undesirable amount of overhead.

One variation of the object id technique reduces the overhead of examining the object tables by using a single index table for the database. Each entry in the index table contains an object id and a table id, where the table id identifies the table that contains the object associated with the object id. To find the object associated with a reference using an index table, the index table is first searched to find the table associated with the object id contained in the reference. Once the appropriate table is identified, the table is searched based on the object id to locate the object associated with the reference.

Unfortunately, the use of a single index table for the whole database is not without its cost. The index table occupies a relatively large amount of data storage because it contains one entry for every object in the database. Relatively large tables, which require more work by the computer system to access and search, degrade performance. Furthermore, the index table is a single resource concurrently accessed by numerous transactions. Specifically, transactions that encounter any reference to any object in the database, transactions adding an object to a table, and transactions deleting an object each require access to the index table. As a consequence, access to the index table becomes a bottleneck and a source of numerous contention delays.

The problems described above are aggravated in a distributed environment, where objects may reside in any database of a number of databases. In a distributed environment, a client accessing a database first forms a "connection" to one of the databases. The database to which a client connects is referred to as the local database. Other databases are referred to as remote databases. Any table which resides on a remote database is referred to as a remote table, or a remote object table in the case of an object table. Often a remote database resides at a location remote to the local database. Because accessing data residing at a remote location consumes more computer resources and requires more time than accessing a data residing at a local location, access to remote tables on remote databases is expensive.

Thus the single index table approach is not practical for a distributed database. Because there is only one index table for the whole database (network), all accesses to distributed database objects depend on access to a single index table in a database. This causes performance, availability, and scalability problems (i.e. the number of users is constrained by performance related problems arising from the single index approach).

It is clearly desirable to provide a method for more efficiently referencing objects that are stored in an object-relational database system.

SUMMARY OF THE INVENTION

A method and apparatus for generating references to a set of objects which reside in a plurality databases is provided. According to one aspect of the invention, each object is associated with a table from a plurality of tables that are contained in the plurality of databases. An object id is associated with each object; the object id uniquely identifies each object relative to the objects in the set of objects. Furthermore, a table id is associated with each object table. The table id uniquely identifies each table relative to tables in the plurality of tables. A table may be located based on the table id associated with the table, and the object may be located in the table based on the object id associated with the object.

According to another aspect of the invention, a table mapping is generated. The table mapping maps a set of tables to databases associated with the set of tables.

References to objects from the set of objects are generated. Each reference comprises data that identifies an object. Each reference contains data representing the object id of the object referred to by the reference (the "referenced object"). Each reference also contains data representing the table id of the table containing the referenced object.

An object is located based on the table mapping and the reference referring to the object. The table containing the object is located based on the data in the reference representing the table id. The object is located within the table using the data in the reference representing the object id.

According to another aspect of the invention, a reference contains a row-id. The row-id represents the row containing the referenced object. The referenced object is located in a table containing the object using the row-id. The reference contains a flag to indicate whether the reference contains data representative of a row-id.

According to another aspect of the invention, an object id is unique relative to all other object ids that are assigned using the same id assignment mechanism. A table id is unique relative to all other table ids that use the same id assignment mechanism.

According to another aspect of the invention, each reference generated has a size that varies from one reference to another. Each reference contains data that represents the size of the reference. The data in the reference representing the object id of the referenced object is also associated with a size. A reference may contain data representing this latter size.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 3A through 3H shows various exemplary tables, table definitions, and object types used to illustrate various embodiments of the invention;

FIGS. 4A and 4B shows an exemplary object type and object view used to illustrate an embodiment of the invention;

FIG. 5 is a block diagram showing an exemplary global table map and an exemplary local table map;

FIG. 6 is a block diagram showing the data structure of references according to various embodiments of the invention.

DETAILED DESCRIPTION OF THE PREFERRED EMBODIMENT

A method and apparatus for generating references to object in a database is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
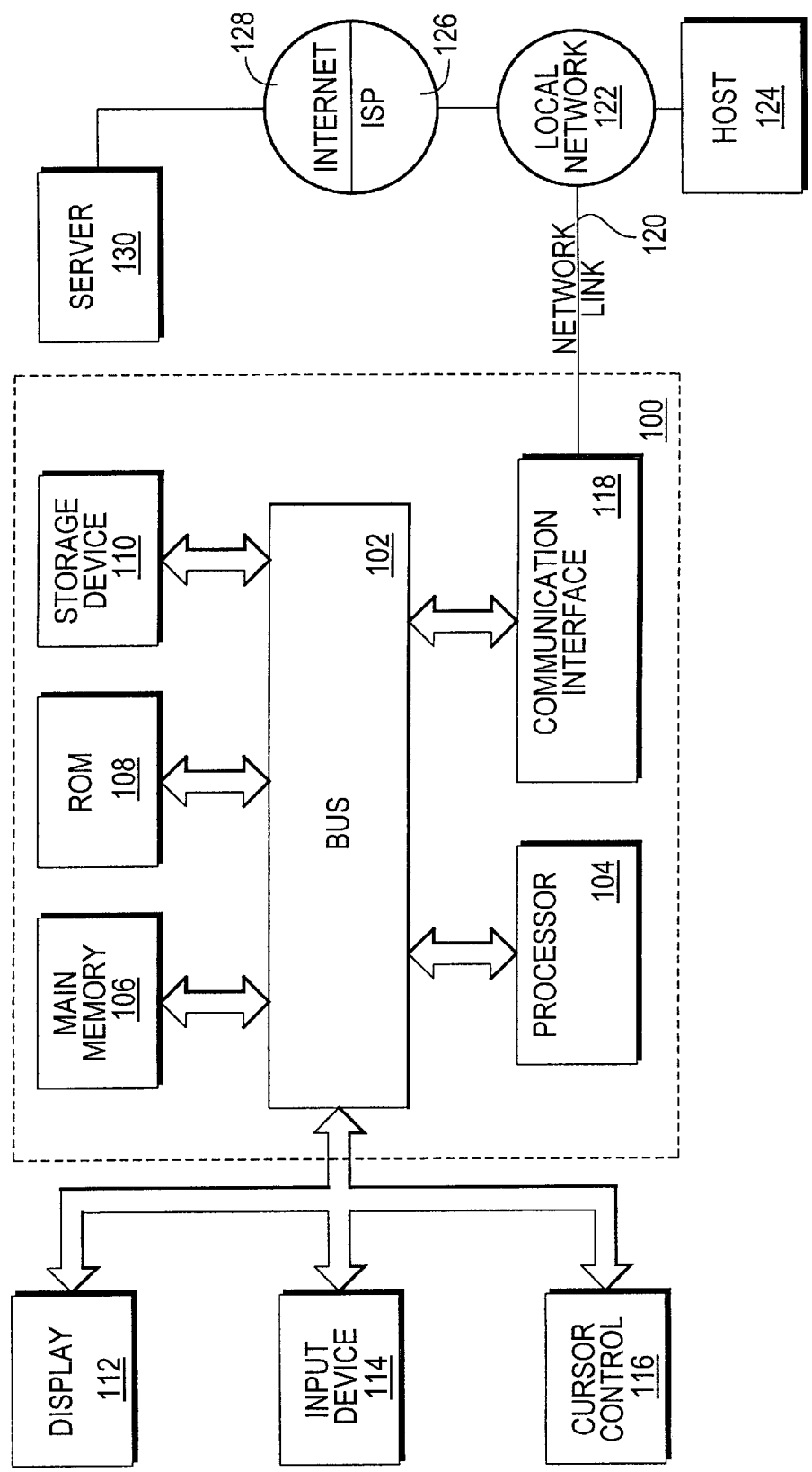
FIG. 1 is a block diagram of a computer system on which the present invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for generating and using references to objects in a database. According to one embodiment of the invention, the generation of references to objects in a database is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for generation of references to objects in a database as described herein.

The received code may be executed by processor 104 as it is received, and/or stored in storage device 110, or other non-volatile storage for later execution. In this manner, computer system 100 may obtain application code in the form of a carrier wave.

DATABASE MANAGEMENT SYSTEMS

A database management system (DBMS) typically includes one or more database servers and one or more databases. A database server is a computer program or group of computer programs used to manage data in a database for the benefit of one or more database clients.

A database client may be a computer system, including the computer system executing the DBMS, or another computer system executing another DBMS. In the computer system 100 of FIG. 1, sequences of instructions comprised by the DBMS are executed by the processor 104 to carry out requests of a database client. These include requests to create storage organizations, requests to store data in storage organizations previously created, requests to present views of data held in storage organizations, and requests to operate on data held in storage organizations either directly or through a view. The requests of a database client may themselves be issued in response to requests received from a individual through a user interface provided by the client.

Figure 2:
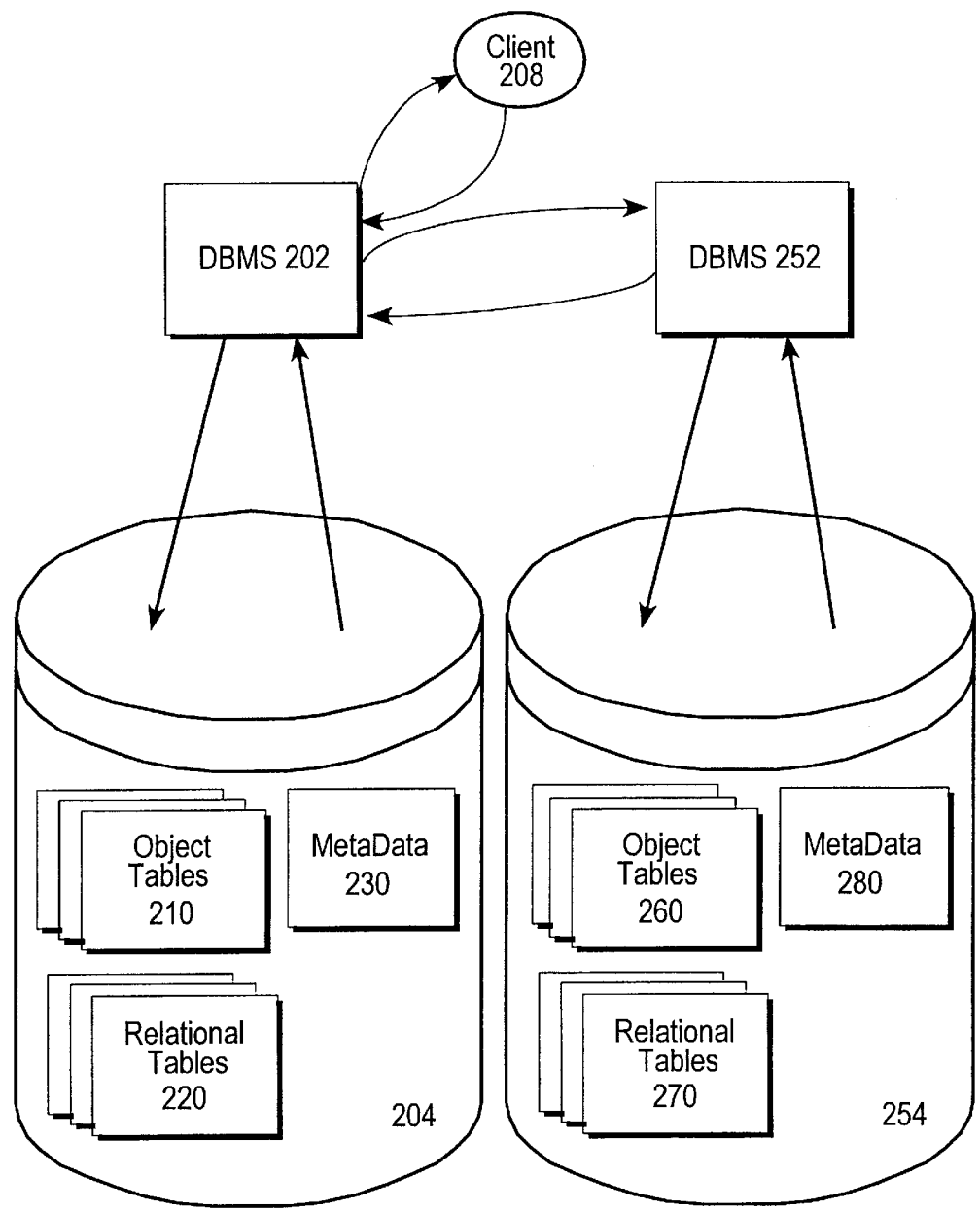
FIG. 2 is a block diagram of a database system on which the present invention may be implemented.

FIG. 2 shows two database servers, database server 202 and database server 252. Database server 202 manages database 204 and database server 252 manages database 254. Database 204 and database 254 contain the storage organizations managed by the database servers 202 and 252, respectively.

Database server 202 manages object tables 210, relational tables 220, and metadata 230. Database server 252 manages object tables 260, relational tables 270, and metadata 280. Metadata contains data which defines data structures or data types used by a DBMS, including storage organizations such as object tables 210 and relational tables 220.

In FIG. 2, a database client is connected to database server 202. The requests issued by database client 208 include requests in the form of structured query language (SQL) statements. The requests may also include requests in the form of functions invoked by software, such as software written in C or PRO*C™ (a version of C available from Oracle Corporation), running on client 208. The functions invoked are part of a set of functions comprising an application interface (API) supported by database server 202 or database server 252, such as OCI™, an Oracle™ product.

Tables are storage organizations used to hold data in a database. Herein, the term table is broadly defined to be a data structure containing one or more categories of data and includes, but is not limited to, object tables and relational tables. Database server 202 and database server 252 are object-relational database servers that support object-oriented methodologies and relational methodologies. Database server 202 and database server 252 operate in similar fashion.

To database server 202, database server 252 is a foreign database server. Relative to database server 202, database 254 is a foreign database because it is managed by the foreign database server 252. Tables contained in a foreign database are referred to as foreign tables.

Client 208 is connected to database server 202, and therefore database server 202 is a local database server relative to client 208. Because database server 252 and database 254 are foreign to the local database server 202 of client 208 (i.e. database server 202), database server 252 and database 254 are foreign relative to client 208.

DATA DEFINITIONS

The data in metadata that defines a particular data structure or data type is referred to as the data definition of the data structure or data type. Data definitions are used, for example, to define object types, object tables, or relational tables. A data definition may be created in response to receiving an SQL statement to create a table. For example, a DBMS creates the table definition represented in (FIG. 3E) for relational table FORMER_EMPLOYEE (FIG. 3F) in response to receiving the following SQL statement:

```
Create Table FORMER_EMPLOYEE
    (NAME      VARCHAR(30),
     SSN       VARCHAR(11),
     STATE     VARCHAR(2));
```

The above statement defines the relational table as having a column called NAME and specifies the column's data type as a VARCHAR having a maximum length of 30. VARCHAR is a primitive data type recognized by a DBMS, such as Oracle8™. A VARCHAR is a string that is variable in length. Other examples of primitive data types include INTEGER and FLOAT.

As used herein, length refers to the amount of the storage medium used to store a data structure in the particular medium in which the data structure is stored. For example, a sequence of bytes may be used to store a data structure of the type VARCHAR in the main memory 106 of computer system 100. Each byte in memory 106 contains one character of the string. If the data structure has a length of 30, 30 bytes would be used to store the data structure. In addition to NAME, the relational table FORMER_EMPLOYEE is defined as having columns SSN and STATE. FIG. 3F shows the relational table FORMER_EMPLOYEE populated with sample data.

A DBMS, such as Oracle8™ creates a data definition for an object type, and stores the data definition in the metadata, in response to receiving a request to create an object type. For example, the object type OT_STATE, shown in FIG. 3A, is defined in response to receiving the following SQL statement:

```
Create Type OT_STATE as Object
    (NAME      VARCHAR(30),
     ABBR      VARCHAR(2));
```

When the preceding SQL statement is received, a DBMS creates and stores a data definition for an object type named OT_STATE in the metadata. OT_STATE is comprised of several attributes, which are NAME, defined to be a VARCHAR(30) (i.e. string up to 30 characters in length), and ABBR, defined to be a character VARCHAR(2) (i.e. string up to 2 characters in length). ABBR is intended to represent the abbreviations of states (e.g. CA, PA).

As mentioned previously, an object table contains objects belonging to the same object type, i.e. the table type. An object table is created by specifying, in the request to create an object table, the object type to which the table's objects belong. For example, the object table STATE, shown in FIG. 3B, is created by database server 202 in response to receiving the following SQL statement:

Create Table STATE of OT_STATE;

Each row in the object table STATE contains the attributes of an object belonging to the object type OT_STATE. Each column of the object table STATE represents an attribute of the objects belonging to the object type OT_STATE. For example, referring to FIG. 3E, the row 350, represents an object belonging to the object type OT_STATE and having a NAME attribute value of "Alabama", and a STATE attribute value of "AL".

When creating an object table, the database server 202 generates a table identification number (TID) and a local table descriptor for the object table. According to one embodiment of the invention, the TID generated for a table is a value that uniquely identifies a table relative to tables in the same or other databases.

A local table descriptor is data that uniquely identifies a table relative to tables contained in the same database as the table. The local table descriptor associated with an object table, for example, is unique relative to any other table contained in the same database as the object table, including relational tables or other object tables. Both the local table descriptor and the TID are stored as part of the data definition of the table in the metadata.

GENERATION OF UNIQUE IDENTIFICATION NUMBERS

According to an embodiment of the invention, the TIDs assigned to tables by database server 202 are unique among any object table accessible by database server 202, including object tables in database 254 that are foreign to database server 202.

Various mechanisms may be used to ensure that the TIDs assigned by database server 202 are unique. For example, TIDs can be made unique among a set of DBMSs by causing each database server in the set of DBMSs to use the same id assignment function when generating TIDs for object tables. An id assignment function may be implemented by a sequence of instructions running on a computer system, which, when executed, generates an id that is unique among any other ids generated by the same function running on any computer system.

Such an id assignment function is available, for example, in a software product called SQL*NET™, generally available from Oracle Corporation. Any applications, including database management systems, that use such a function to generate ids within any computer system are assured that the generated ids are unique relative to previously generated ids and relative to the ids generated for any other application using the same function.

Various mechanisms for generating an id that is unique relative to any other id generated by the same mechanism running on any computer system are well to known those skilled in the art. Therefore, it is understood that the present invention is not limited to any particular mechanism for generating unique ids that are unique relative to any id generated by the same mechanism.

OBJECT IDS

Referring again to FIG. 3B, each object in object table STATE is associated with an object id ("OID"). An object ID is assigned by the DBMS when an object in an object table is created. An object may be created, for example, by an SQL insert command. The object id is unique among any object created by any application that uses the same id assignment mechanism in generating object ids for objects, including DBMSs that use the same id assignment mechanism. In one embodiment of the invention, the same id assignment mechanism is used to generate TIDs and OIDs.

Note that the sample TID and OID values shown in FIGS. 3B, 3D, 3H, and 4B are only 6 characters in length. The TIDs and OIDs shown in FIGS. 3B, 3D, 3H, and 4B are intended to be illustrative, and not intended to represent actual TIDs and OIDs. Typically, ids assigned to object tables and objects are much greater in length, or contain more significant digits than the illustrative TIDs and OIDs shown in FIGS. 3B, 3D, and 4B. For example, OIDs and TIDs generated by the Oracle8™ DBMS can represent numbers up to $2_{128}-1$.

TABLE MAPPINGS

A table mapping is a set of data structures that contain data indicating the database containing a particular table. FIG. 5 shows a table mapping of one embodiment of the invention, which comprises global table map 504 and local table map 554.

Referring to FIG. 5, the entries in local table map 554 each contain a TID and a local table descriptor. A local table descriptor is data that uniquely identifies a table relative to other local tables. Each entry thus serves as a mapping between a TID and the object table identified by the local table descriptor.

A local table map is maintained in a manner that keeps the table consistent with the database containing the local table map. The table map thus only contains entries that correspond to object tables in the database containing the local table map. For example, when an object table is created, an entry for that object table is created in the local table map. The entry just created contains the TID and the local table descriptor associated with the object table. When the object table is moved from a first database to a second database, an entry corresponding to the object table is removed from the local table map of the first database, and an entry corresponding to the object table is added to the local table map of the second database.

FIG. 5 also shows a global table map 504, which is contained in database 204. Global table map 504 contains entries for foreign tables. Each entry in global table map 504 contains a TID and a database descriptor. A database descriptor is data that uniquely identifies a database among multiple databases. Each entry thus serves as a mapping between the foreign table associated with the TID and the database identified by the database descriptor. Because the TID is unique between local tables and foreign tables, the database to which any mapped object table belongs can be determined based on the TID associated with the object table. Any object table associated with any entry in the global table map is referred to as a mapped table relative to the global table map.

Entries are added to the global table map 504 when a foreign reference is generated, as shall be described in further detail. Entries may also be added by the execution of a table mapping utility that creates entries for foreign object tables. The table mapping utility scans one database for object tables contained in that database and makes entries for those object tables in another database.

In an embodiment of the invention, global table map 504 and local table map 554 may be either an object table or a relational table. Therefore, client 208 can issue SQL statements inserting or updating entries in global table map 504 of either database 204 or database 254.

GENERATING REFERENCES

References are generated in response to requests received by a database server 202 or database server 252 for references to objects. For example, a request may be made by a client 208 by issuing an SQL query statement that designates that the data to be returned include references to the objects returned by the database server 202 to client 208 in response to the query. The data returned in response to a query is herein referred to as the query results. The objects contained in the query results are referred to as the returned objects. In response to receiving the above query, database server 202 finds the objects specified in the query and returns the query results, including the references to returned objects. For example, consider the following SQL statement issued by client 208 to database server 202:

Select REF(s) From STATE s;

In response to receiving the SQL statement, the database server 202 returns to client 208 a reference to every object contained in object table STATE (FIG. 3B) that matches the query represented by the above statement. In the example, all the objects in the object table STATE would be returned to client 208. When the client receives the references, the client 208 may store the references.

One of the above references received by client 208 may later be used to by client 208 to populate an attribute of an object, referred to as a reference attribute. For example, client 208 may transmit an SQL insert statement to database server 202 to create an object. The insert statement would specify that one of the attributes to be populated is a reference attribute, and the data with which to populate the attribute is one of the references previously received by client 208.

A reference attribute is an attribute that is a reference to an object of a particular type. A reference attribute may be defined by an object type. For example, consider the following SQL statement:

| | |
|---|---|
| Create Type OT_PERSON as Object | |
| (NAME | VARCHAR(30), |
| SSN | VARCHAR(9), |
| STATE | REF OT_STATE); |

In response to receiving the above statement, a DBMS, such as Oracle8™, defines the object type OT_PERSON object type (FIG. 3C) as having a STATE attribute that is a reference to an object belonging to the object type OT_STATE.

Referring to FIG. 3D, the object table EMPLOYEE is an example of an object table containing objects having a reference attribute. The table type of EMPLOYEE is PERSON. Note that the STATE attribute of the objects contained in the object table EMPLOYEE may be referred to as EMPLOYEE.STATE. Other attributes associated with a particular object table or object type may be referred to according to the following form:

<object table or object type>.<attribute>

The EMPLOYEE.STATE reference attribute of the objects contained in EMPLOYEE is a reference to any object belonging to the object type OT_STATE. The reference attribute may refer to an object in the object table STATE, or it may refer to another object table containing objects belonging to the object type OT_STATE. For example, another object table, called COUNTRY_X_STATES, may also contain objects belonging to the object type OT_STATE.

Assume COUNTRY_X_STATES represents the states in the country X. The EMPLOYEE.STATE attribute of an object in the object table EMPLOYEE may refer to an object in object table STATE, or refer to an object in object table COUNTRY_X_STATE. As shall be described in further detail, a reference contains information indicating the object table to which the referred object belongs.

REFERENCES

FIG. 6 shows the data structure of a reference 610 according to an embodiment of the invention. Reference 610 includes an Rlength field, a row id flag field, a key-based OID flag field, an Olength field, an OID field, a TID field and a row-id field. Each of these fields shall be described in greater detail below.

In the illustrated embodiment of the invention, the length of a reference is variable, i.e. the length of one reference may differ from the length of another reference. Consequently, reference 610 contains the Rlength field. The value stored in the Rlength field specifies the length of reference 610. The Rlength field is fixed length and is stored at the beginning of reference 610 in order to indicate the number of bytes in reference 610.

The row-id flag field of reference 610 indicates whether the reference contains a row-id field. The contents and use of the row-id field are described in greater detail below. The key-based flag indicates whether the reference is a key-based reference. Row-ids and key-based references shall be described in further detail. In one embodiment of the invention, the row-id flag and the key-based flag are each represented by a bit in a status byte. For example, the bit representing the row-id flag in the status byte being set to 1 represents that the reference contains a row-id.

The row-id field of reference 610 contains data that represents a row-id. A row-id represents the location of a specific entry in a table. Row-ids are well known to those skilled in the art and are not further described. The row-id field in a reference represents the row-id of a row (in an object table) that, at one point in time, contained the object referred to by the reference. A row-id associated with an object may change after a reference in the database is created as result of running utilities that re-organize rows in tables more efficiently. Other utilities may be run that find references in the database with row-id fields that do not refer to a row containing the referred to object, and then correct such row-id fields.

The OID field is the OID of the object referred to by a reference. The Olength field stores a value of the OID field. In various embodiments of the invention, the length of the OID may or may not be variable. An OID is variable, when, for example, the OID is key based. Key based OIDs are explained in greater detail below. When the length of an OID is not variable, the Olength field may be omitted from the data structure of a reference.

The TID field contains the TID of the table that contains the object referred to by a reference.

GENERATING REFERENCES

Database server 202 creates a reference when, for example, a query specifies that a reference be returned for the objects matching the query. An example of such a query was described above. For each of the objects matching the query, the DBMS creates in the memory, or other storage medium, values for the fields in reference 610. For example, assume that client 208 transmits to database server 202 an SQL statement representing a query of the EMPLOYEE table (FIG. 3D):

Select REF(e), NAME, STATE From EMPLOYEE e
    Where SSN='999-99-9999';

In response, the database server 202 determines that the object with OID 000000 in the EMPLOYEE object table matches the query. This object is referred to as the selected object. The database server 202 then generates the reference to the selected object.

Generating the reference includes determining the value of the TID field. This value can be found in the data definition of EMPLOYEE table. Then the OID for the selected object is read from the OID column of the row containing the selected object. The row-id of the row in which the object is located is stored in the row-id field. The row-id flag is set to indicate that the reference contains a row-id. Then the length of the reference is calculated and stored in the Rlength field. Finally, the reference is returned as part of the data returned by the database server 202 representing the results of the above query.

LOCATING OBJECTS BASED ON REFERENCES

A reference is used to locate an object. The need to locate objects based on references arises in many contexts. For example, consider the following PL/SQL™ code fragment:

```
Declare empref Ref EMPLOYEE;
Declare empname VARCHAR2(30);

Select REF(e) From EMPLOYEE e Where SSN = '999-99-9999' Into
    empref;
empname :=empref.name;
```

The first line represents a declaration of a variable containing a reference. Assume that in the third line of code, empref represents a reference to the object. The third line causes the server to return the reference to the object in EMPLOYEE whose SSN attribute value equals '999-99-999'. The reference returned contains the OID of the object, which is '000000'. In response to executing the instructions represented by the third line, client 208 transmits a request for the object. The request includes a reference. In response to receiving the request, the database server 202 locates the object, and then transmits to the client the object data requested by the client, including data for the NAME attribute for the object data.

Figure 7:
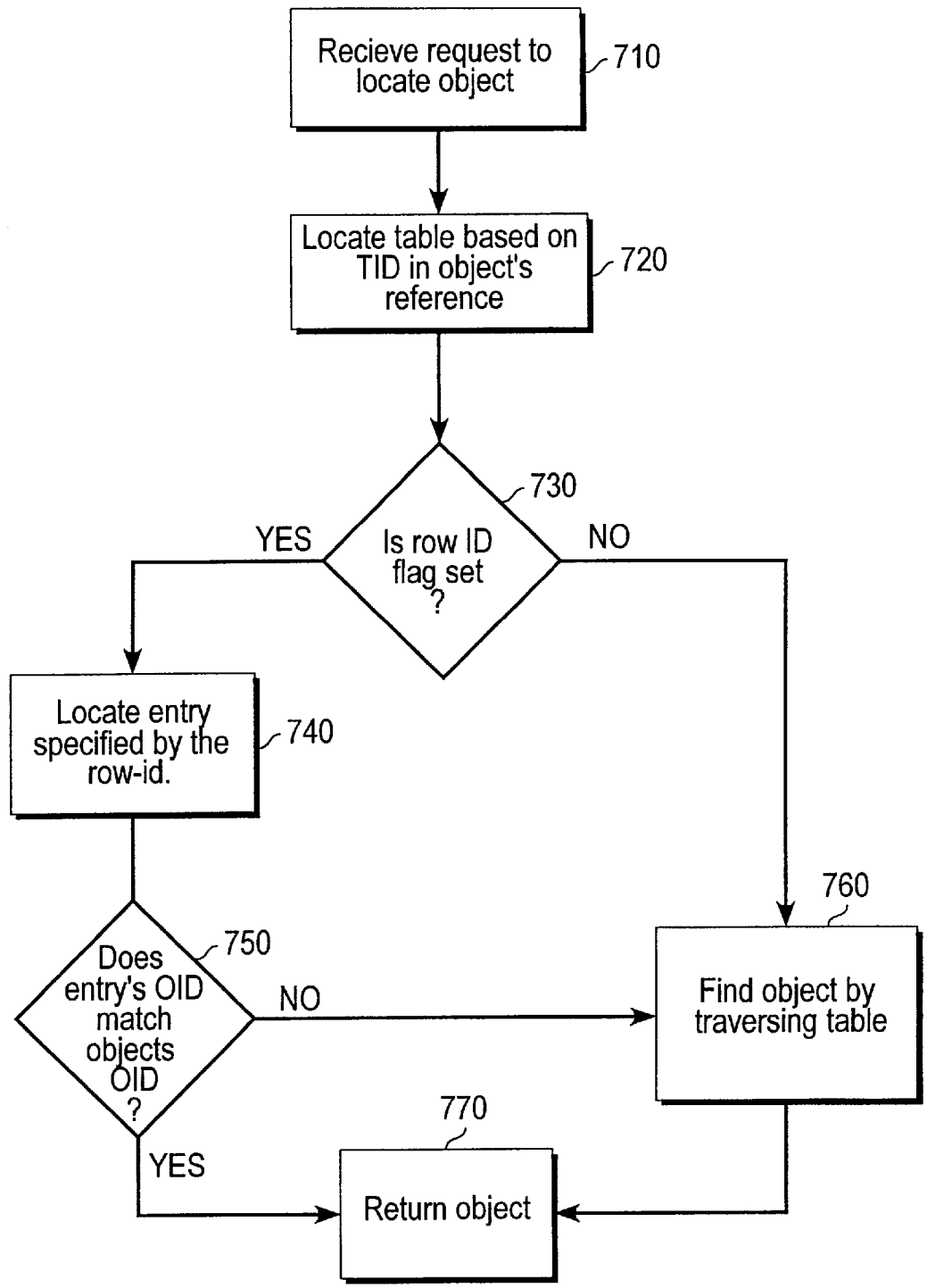
FIG. 7 is flow chart showing a method of locating an object in a database based on a reference to that object according to an embodiment of the invention.

FIG. 7 represents the steps for locating an object based on a reference according to an embodiment of the invention. The steps are illustrated in reference to the above example, the EMPLOYEE object table shown in FIG. 3D, and exemplary reference 630 (FIG. 3).

At step 710, the database server receives a request to locate an object based on the reference. The request includes the reference. In this example, client 208 invokes the function of the API for database server 202 for requesting objects based on references. Database server 202 receives the request along with the reference. The reference received along with the request is referred to as the request reference. The object requested by the client is herein called the requested object, the object referred to by the request reference.

At step 720, the object table containing the requested object is located based on the TID field of the requested reference. The object table containing the requested object is referred to as the requested table. First, local table map 554 is scanned to find an entry containing a TID matching the TID field of the requested reference. If an entry is found, then the requested object is in a local table, and database server 202 locates the requested table based on the local table descriptor and the metadata. Control then passes to step 730.

If on the other hand no entry is found in local table map 554, then the requested object table is a foreign object table. The global table map 504 is examined for the entry matching the TID. Based on the DBMS descriptor contained in the entry with the matching TID, the DBMS is able to determine which database contains the requested table and the requested object. Database server 202 sends a message to the foreign DBMS managing the foreign database on which the foreign table resides. The request includes the information contained in the requested reference. In response, the foreign DBMS performs the steps for locating the requested table based on the local table descriptor and metadata described immediately above. Control then passes to step 730.

In this example, the TID field in the reference is 999, the TID of the object table EMPLOYEE. Assume that when database server 202 examines the mapping table, it finds that the database descriptor in the matching entry indicates the object table is located in database 204, the local database. Then database server 202 scans its local table map for the entry with a TID matching the TID field of the request reference. Database server 202 finds the entry with TID 999. Based on the local table descriptor contained in the entry, database server 202 locates the requested table. Control therefore passes to step 730.

At step 730, a determination is made of whether the row-id flag is set to indicate whether a row-id is contained in the request reference. If the row-id flag is set to indicate that the reference contains a row-id, control passes to step 740. Otherwise, control passes to step 760. In this example, the row-id flag indicates a row-id is present. Therefore, control passes to step 740.

At step 740, the entry in the requested table corresponding to the row-id is located. The row represented by the row-id is accessed and the OID contained in the row is examined.

At step 750, a determination is made of whether the OID being examined matches the value in the OID field of the request reference. When the OID being examined and value in the OID field match, then the object represented by the row is the requested object. If the OID being examined matches the value in the OID field, control passes to step 770. Otherwise, control passes to step 760.

In this example, the database server 202 accesses the object table EMPLOYEE (FIG. 3D), and examines the OID contained in row 308. Because the OID being examined has a value of 000000, which matches the OID field of the request reference, control passes to step 770.

At step 770, the data representing the object is returned to the client. If a foreign database contains the object, data representing the object is returned to the database server of the local database, which in turn transmits the data to the client.

Step 760 is performed when the requested reference does not include a row-id, or the row specified by the row-id does not represent the requested object. In step 760, the requested table is traversed for the row containing an OID matching the OID field of request reference, using methods well known to those skilled in the art.

OBJECT VIEWS

A view is the presentation as a table of data from one or more tables in a database. An object view is presentation of data as a set of objects in an object table. A DBMS generates an object view based on an object view definition stored in the metadata.

An object view definition is created in response to receiving a request from a database client to create an object view definition. The request specifies the tables and the columns in the tables that are used to represent the attributes of the objects presented by the object view. The request also specifies the one or more columns that will be used to generate OIDs for the objects presented by the object view. In response to receiving the request to create an object view, the DBMS stores an object view definition in the metadata. A TID is assigned to the object view.

KEY-BASED REFERENCES

The request to create an object view definition may also specify the one or more attributes of the object view that are used to generate OIDs for the objects presented by the object view. An OID generated in this fashion is referred to as a key-based OID. The attributes that are specified as the attributes to use to generate the OID are referred to as the OID attributes.

References based on key-based OIDs are referred to as key-based references. Key-based references are used to refer to objects presented by an object view that is based on a relational table. A key-based reference may be generated by a database server in response to receiving a query of an object view.

Because the actual data stored in any column corresponding to an OID attribute for a set of rows may vary in length, key-based OIDs vary in length. Consequently, the OID field in a key-based reference is variable.

For example, consider the object view definition FEMPLOYEE (FIG. 4B), created by DBMS 22 when it receives the following SQL statement:

```
Create View FEMPLOYEE of OT_FEMPLOYEE
    With OID(SSN)
    SELECT    f.NAME,
              f.SSN,
    FROM      FORMER_EMPLOYEE f;
```

Object view FEMPLOYEE is created based on the OT_FEMPLOYEE object type shown in FIG. 4A. The above statement specifies the attribute SSN of OT_FEMPLOYEE as the OID attribute for the object view FEMPLOYEE. The objects presented by an FEMPLOYEE object view have attributes as defined by OT_FEMPLOYEE, which are NAME and SSN. The columns FORMER_EMPLOYEE.NAME and FORMER_EMPLOYEE.SSN correspond to the NAME and SSN attributes of OT_FEMPLOYEE respectively.

When a reference is key-based, the key-based flag is set to indicates so. The reference also includes an Olength field, which precedes the OID in the reference. The Olength field indicates the length of the key-based OID. In addition to systems using key-based OIDs, the Olength field may be used to indicate the length of the OID field in any system where the OID field length in a reference is variable.

LOCATING OBJECTS BASED ON KEY-BASED REFERENCES

In an embodiment of the invention where the references may be key-based, database server 202 follows the above steps, modified as follows. At step 720, database server 202 determines whether the requested reference is key-based by examining the key-based flag. If the request reference is not key-based, then performance of the steps proceeds as previously described.

If the key-based reference is based on an object view, then database server 202 determines the database containing the object view in substantially the same manner as database server 202 determines the database of the requested tables. The database server 202 appends a where condition based on the OID field in the request reference. Specifically, the view is modified as if the object view definition included a "Where" condition that the OID columns of the object view match the OID field of the request reference. The view is evaluated resulting in the requested object.

For example, consider a query of the view FEMPLOYEE (FIG. 4B), represented by the following PL/SQL™ code:

```
Declare  empref  Ref   OT_FEMPLOYEE;
.
.
Select NAME From FEMPLOYEE f Where REF(f) = empref;
```

The first line represents a declaration of a reference variable. Assume that when computer instructions represented by the second line of code are being executed by client 208, empref represents a reference with an OID field having a value of '999-99-9999', with a TID field having a value of 800, the TID associated with the view FEMPLOYEE. Further assume, that the client executing the above PL/SQL™ transmits a request for a query of the object specified by the reference represented by empref. In response to receiving the request, the DBMS would generate a query of the object view similar to the one represented by the following PL/SQL™ code:

Select NAME From FEMPLOYEE Where SSN='999-99-9999';

SSN is the OID attribute. The 'Where' condition specifies that the SSN attribute match the OID field in the request reference.

REFERENCES TO FOREIGN OBJECTS

A reference to a foreign object is a reference to an object contained in another DMBS (i.e. foreign database). When a reference to a foreign object is generated, an entry is added to the global table map of the local DBMS. This entry contains the TID of the foreign object table and the database descriptor of foreign database containing the foreign object.

For example, assume that client 208 issues the following SQL query statement to database server 202 for data in object table EMPLOYEE_ARCHIVE (FIG. 3H), which is in database server 252:

Select REF(EMPLOYEE_ARCHIVE),NAME, SSN
  From EMPLOYEE_ARCHIVE@DBMS254;

Assume "@DBMS254" designates that the table is located in database managed by database server 252, database 254, which is a foreign database to database server 202. Further assume that the objects in EMPLOYEE_ARCHIVE (FIG. 3H) belong to the OT_ARCHIVED_EMPLOYEE object type (FIG. 3G), and that object table EMPLOYEE_ARCHIVE is located in database 254. Note that the above statement specifies that the query results include references to the returned objects, the returned objects being foreign objects in EMPLOYEE_ARCHIVE.

In response to database server 202 receiving the request from client 208, database server 202 requests the data specified by the above SQL query statement from database server 252, including the references (returned references). The request may be in the form of an SQL statement or an API function call.

Because the returned references are references to foreign objects, database server 202 updates global table map 504. An entry is inserted into global table map 504 with a TID corresponding to the TID of EMPLOYEE_ARCHIVE and a database descriptor corresponding to database server 252. Maintaining global table map 504 in this manner ensures that if a returned reference is used to access an object, that the TID specified by the TID field in the returned reference is mapped in global table map 504.

ALTERNATE TABLE MAPPINGS

While one approach for providing a table mapping has been described, there are alternatives. Therefore, it is understood that the present invention is not limited to any particular approach for providing a table mapping.

For example, in one embodiment of the present invention, the table mapping comprises a local-name table and a local-descriptor-to-database-descriptor table. The local-name table contains entries for both foreign object tables and local object tables. Each entry contains a TID and a local table descriptor, which represents the local name of the object table corresponding to the entry. Each entry thus serves as a mapping between the TID and the object table that corresponds to the entry's local table descriptor.

A local-descriptor-to-database descriptor table contains entries, for both foreign object tables and local object tables, that map a local table descriptor to a database descriptor. Each entry thus serves as a mapping between the table associated with a local table descriptor and the database associated with the database descriptor.

In step 720, the requested object table is located by first scanning the local-name table to find the local table descriptor associated with TID contained in the requested reference. Then the local-descriptor-to-database-descriptor table is scanned, using the local table descriptor, to determine the database mapped to the requested object table. Once the database is found, the object table can be located.

In another embodiment of the present invention, there is no counterpart to the local table map 554. Instead, the global table map 504 comprises a table having columns for a TID, a local table descriptor, and a database descriptor. Each row is associated with a local or foreign object table. If the row is associated with a local table, then the local table descriptor column contains a value representing a local table descriptor and the database descriptor column has no value (i.e. a value representing no database). If, on the other hand, the row is associated with a foreign table, then the local table descriptor column contains no value (i.e. a value representing no local table) and the database descriptor column has value representing the database descriptor of the database containing the object table.

In step 720, the requested object table is found by first scanning the global table map 504 for the row containing the TID associated with the requested object table.

Next, the database containing the object table is determined. First, the local table descriptor column is read. If the local table descriptor has a value, then the requested object table is a local table. If, on the other hand, the local table descriptor has no value, then the database descriptor column is read. The database that contains the object table is the database associated with the database descriptor.

Once the database is determined, the object table is located in a manner similar to that previously described.

BATCHING BASED ON OBJECT REFERENCES

A single request that specifies the performance of an action upon group of objects, rather than a single object, is referred to as a batch request. For example, consider the request represented by the following previously described PL/SQL statement:

Select REF(e) From EMPLOYEE e Where SSN='999-99-9999';

The where condition specifies the SSN attribute of an object. Assume that the SSN attribute is the key for EMPLOYEE, and thus only one object can possibly match the where condition. This request thus represents a request for a single object, and is therefore not a batch request.

Consider the following previously described PL/SQL statement:

Select REF(s) From STATE s;

As explained earlier, this request is a request for references of all the objects in STATE. Because this request specifies a group of objects, the request is a batch request.

Batch requests take many forms. In one embodiment of the invention, a batch request can be made to pin a group of objects. For example, a batch pin function, a function for pinning a group of objects, may provide for the purposes of specifying the objects to pin, a parameter for an array or list of object references. A pin is a request to load one or more objects into memory so that the objects may be accessed and manipulated. The array or list of object references may contain TIDs of more than one object table or view.

Typically, when a batch request is based on an SQL statement specifying a query, the operation specified by the SQL statement may only operate on objects from one source (i.e. the extent of the table or view specified the SQL statement). One the other hand, when a making a batch request based on a list of object references, objects from more than one source (e.g. table or view) may be operated upon.

For example, assume that it is desired to update data representing the attributes of objects x residing in object table x, and objects y residing in object table y. To request the updates based on SQL statements, two requests are required. To issue a request using an update function that operates upon an array of references to objects x and objects y, requires one request in the form of one function invocation for the entire ararry of references.

Requesting objects from multiple tables or views by issuing one request is especially an advantage in a network environment, where requests are transmitted and objects are returned across a network. Consolidating requests for objects from multiple tables or views reduces network traffic and increases performance.

The methods described herein offer many advantages over previous methods for locating objects based on references to objects. One advantage is the ability to determine the location of the object table containing a sought object without having to scan multiple object tables or the indexes of multiple object tables. Instead, the global table map is scanned to determine which table contains the sought object, and then local table map 554 is scanned to determine which database contains the object. Typically, the global table map and local table map are much smaller than many of the object tables containing the sought objects, and can therefore be stored in entirety in main memory 106 of a computer system 100 while a DBMS, such as database server 202, is running. Storage in a dynamic storage mechanism, such as main memory 106, provides far quicker access than storage in other mediums, such as computer disk drive.

Another advantage is the ability to locate the row corresponding to the sought object in the object table using the row-id. Because the reference makes the row-id available, an object can be located in an object table without the need to traverse the object table's entries or to create an index based on the object id.

Furthermore, the row-id is used only as a "hint". When the row identified by the row-id is examined, the object id contained in the row is verified to ensure it matches the object id of the sought object. When there isn't a match, the sought object is located using conventional methods, such as traversing the object table containing the sought object. Because the row-id is relied upon as only a "hint", and not an absolute indicator of an object's location in the object table containing the object, the attributes of an object may be transferred to a different row without causing the errors that arise due to mistakenly locating an object.

Another advantage is that a reference may continue to be used to locate the objects even when the object tables containing the objects are transferred from one database to another database. Because a TID is unique among the databases using the same object id mechanism, the TID value in a reference continues to uniquely identify an object table as it is moved from a database that uses an object id mechanism to another database using the same mechanism. As a consequence, the mappings in the global table map, which are based on the correlation between the TIDs and database descriptor contained in each entry, can be relied upon to establish the location of an object table, even after the object table has been moved from one database to another.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. In a computer system, a method of locating an object that belongs to a set of objects that reside in a plurality of databases, the method comprising the steps of:

associating an object id with each object from said set of objects, wherein each object from said set of objects is contained in a table from a plurality of tables, wherein said plurality of tables are from said plurality of databases;

associating a table id with each table of said plurality of tables;

wherein the table id associated with each of said plurality of tables is not assigned to any other table in any of said plurality of databases;

locating a table that contains said object based on the table id that is associated with the table that contains the object; and locating said object within said table based on the object id that is associated with said object.

2. The method of claim 1, further comprising the step of generating a table mapping, wherein the table mapping maps a mapped set of tables to databases associated with said mapped set of tables, wherein said mapped set of tables includes said plurality of tables.

3. The method of claim 2, further comprising the step of generating references referring to objects that belong to said set of objects, each reference comprising data identifying a referenced object, the referenced object being an object from said set of objects.

4. The method of claim 3, wherein the step of generating references includes generating references that contain:

data representing the object id of the referenced object; and data representing the table id of the table containing the referenced object.

5. The method of claim 4, wherein the step of generating references includes generating references that contain data representing a row-id, the row-id being associated with the table that contains the referenced object.

6. The method of claim 5, wherein:

the step of locating the object includes the steps of:

locating the object based on the table mapping and a particular reference referring to the object, wherein the particular reference contains data representing a particular row-id associated with the table; and accessing the object in the table based on the data representing the particular row-id.

7. The method of claim 6, wherein:

the particular row-id specifies a specified entry in the table; and the step of accessing the object includes the step of determining whether an object id associated with the specified entry identifies the object.

8. The method of claim 5, wherein the step of generating references includes generating references that contain data representing whether the particular reference contains any row-id.

9. The method of claim 4, wherein:

the data representing the object id of the referenced object has a size; and the step of generating references includes generating data representing the size of data representing the object id of the referenced object.

10. The method of claim 3, wherein the step of locating said object includes the step of locating said object based on the table mapping and a particular reference referring to said object.

11. The method of claim 10, wherein:

the particular reference contains data representing the table id associated with the table; and the step of locating the table includes determining the particular database associated with the table based on the data representing the table id associated with the table.

12. The method of claim 3, wherein:

each reference has a reference size;

the references sizes of references is variable; and the step of generating references includes generating references that contain data representing the size of the reference.

13. The method of claim 3, wherein the step of associating an object id with each object includes the step of associating at least one of said objects from the set of objects with a user specified object id.

14. The method of claim 3, further including the steps of:

receiving from a foreign database a reference to an object contained in a foreign table, the foreign table belonging to the foreign database; and adding to the table mapping a mapping of the foreign table to the foreign database.

15. The method of claim 1, wherein the step of associating an object id with each object includes associating an object id that is unique relative to all other object ids that are assigned using the same id assignment mechanism.

16. The method of claim 1, wherein the step of associating a table id includes associating a table id that is unique relative to all other table ids that are assigned using the same id assignment mechanism.

17. In a computer system, a method of accessing an object that belongs to a set of objects that reside in a set of one or more databases, the method comprising the steps of:

receiving a reference to the object, wherein each object from the set of objects is contained in a table from a plurality of tables;

reading a table identifier from the reference;

locating a table associated with the table identifier; and accessing the object from the table associated with the table identifier.

18. The method of claim 17, wherein the step of locating a table associated with a table identifier includes locating a table associated with a table identifier that is unique relative to all other table identifiers that are assigned using the same id assignment mechanism.

19. In a computer system, a method of accessing an object that belongs to a set of objects that reside in a set of one or more databases, the method comprising the steps of:

receiving a reference to the object that has a first object identifier;

reading a row-id from the reference;

reading a second object identifier from a row that resides at a location identified by the row-id;

if the second object identifier matches said first object identifier, then accessing the object from said row; and if the second object identifier does not match said first object identifier, then locating the object in another row using the first object identifier.

20. The method of claim 19, wherein:

the method further includes the step of extracting a table identifier from the object identifier; and the step of locating said object in another row using the object identifier includes finding a row in said table that specifies a third object identifier that matches said first object identifier.

21. A computer-readable medium carrying one or more sequences of one or more instructions for locating an object that belongs to a set of objects that reside in a plurality of databases, wherein the execution of the one or more sequences of the one or more instructions causes the one or more processors to perform the steps of:

associating an object id with each object from the set of objects, wherein each object from said set of objects is contained in a table from a plurality of tables, wherein said plurality of tables are from the plurality of databases;

associating a table id with each table of said plurality of tables;

wherein the table id associated with each of said plurality of tables is not assigned to any other table in any of said plurality of databases;

locating a table that contains said object based on the table id that is associated with the table that contains the object; and locating said object within said table based on the object id that is associated with said object.

22. The computer readable medium of claim 21, further carrying sequences of instructions for performing the step of generating a table mapping, wherein the table mapping maps a mapped set of tables to databases associated with said mapped set of tables, wherein said mapped set of tables includes said plurality of tables.

23. The computer readable medium of claim 22, further carrying sequences of instructions for performing the step of generating references referring to objects that belong to said set of objects, each reference comprising data identifying a referenced object, the referenced object being an object from said set of objects.

24. The computer readable medium of claim 23, wherein the step of generating references includes generating references that contain:

data representing the object id of the referenced object; and data representing the table id of the table containing the referenced object.

25. The computer readable medium of claim 24, wherein the step of generating references includes generating references that contain data representing a row-id, the row-id being associated with the table that contains the referenced object.

26. The computer readable medium of claim 25, wherein:

the step of locating the object includes the steps of:

locating the object based on the table mapping and a particular reference referring to the object, wherein the particular reference contains data representing a particular row-id associated with the table; and accessing the object in the table based on the data representing the particular row-id.

27. The computer readable medium of claim 26, wherein:

the particular row-id specifies a specified entry in the table; and the step of accessing the object includes the step of determining whether an object id associated with the specified entry identifies the object.

28. The computer readable medium of claim 25, wherein the step of generating references includes generating references that contain data representing whether the particular reference contains any row-id.

29. The computer readable medium of claim 24, wherein:

the data representing the object id of the referenced object has a size; and the step of generating references includes generating data representing the size of data representing the object id of the referenced object.

30. The computer readable medium of claim 23, wherein the step of locating said object includes the step of locating said object based on the table mapping and a particular reference referring to said object.

31. The computer readable medium of claim 30, wherein:

the particular reference contains data representing the table id associated with the table; and the step of locating the table includes determining the particular database associated with the table based on the data representing the table id associated with the table.

32. The computer readable medium of claim 23, wherein:

each reference has a reference size;

the references sizes of references is variable; and the step of generating references includes generating references that contain data representing the size of the reference.

33. The computer readable medium of claim 23, wherein the step of associating an object id with each object includes the step of associating at least one of said objects from the set of objects with a user specified object id.

34. The computer readable medium of claim 23, further carrying sequences of instructions for performing the steps of:

receiving from a foreign database a reference to an object contained in a foreign table, the foreign table belonging to the foreign database; and adding to the table mapping a mapping of the foreign table to the foreign database.

35. The computer readable medium of claim 21, wherein the step of associating an object id with each object includes associating an object id that is unique relative to all other object ids that are assigned using the same id assignment mechanism.

36. The computer readable medium of claim 21, wherein the step of associating a table id includes associating a table id that is unique relative to all other table ids that are assigned using the same id assignment mechanism.

37. A computer-readable medium carrying one or more sequences of one or more instructions for accessing an object that belongs to a set of objects that reside in a set of one or more databases, wherein the execution of the one or more sequences of the one or more instructions causes the one or more processors to perform the steps of:

receiving a reference to the object, wherein each object from said set of objects is contained in a table from a plurality of tables;

reading a table identifier from the reference;

locating a table associated with the table identifier; and accessing the object from the table associated with the table identifier.

38. The computer-readable medium of claim 37, wherein the step of locating a table associated with a table identifier includes locating a table associated with a table identifier that is unique relative to all other table identifiers that are assigned using the same id assignment mechanism.

39. A computer-readable medium carrying one or more sequences of one or more instructions for accessing an object that belongs to a set of objects that reside in a set of one or more databases, wherein the execution of the one or more sequences of the one or more instructions causes the one or more processors to perform the steps of:

receiving a reference to the object that has a first object identifier;

reading a row-id from the reference;

reading a second object identifier from a row that resides at a location identified by the row-id;

if the second object identifier matches said first object identifier, then accessing the object from said row; and if the second object identifier does not match said first object identifier, then locating the object in another row using the first object identifier.

40. The computer-readable media of claim 39, wherein:

the computer-readable media further including sequences of instructions for performing the step of extracting a table identifier from the object identifier; and the step of locating said object in another row using the object identifier includes finding a row in said table that specifies a third object identifier that matches said first object identifier.

41. A computer system comprising:

a processor;

a memory coupled to said processor;

a plurality of databases;

a set of objects that reside in said plurality of databases;

a set of tables that reside in said plurality of databases, wherein each object from said set of objects is contained in a table from said plurality of tables;

said processor configured to associate an object id with each object from said set of objects;

said processor configured to associate a table id with each table of said plurality of tables;

wherein the table id associated with each of said plurality of tables is not assigned to any other table in any of said plurality of databases;

said processor configured to locate a table that contains said object based on the table id that is associated with the table that contains the object; and said processor configured to locate said object within said table based on the object id that is associated with said object.

42. A computer system comprising:

a processor;

a memory coupled to said processor;

a set of one or more databases;

a plurality of tables that reside in the set of databases;

a set of objects that reside in the set of one or more databases, wherein each object from said set of objects is contained in a table from said plurality of tables;

said processor configured to receive a reference to an object, wherein the object is from the set of objects that reside in the set of databases;

said processor configured to read a table identifier from the reference;

said processor configured to locate a table associated with the table identifier; and said processor configured to access the object from the table associated with the table identifier.

43. A computer system comprising:

a processor;

a memory coupled to said processor;

a set of one or more databases;

a set of objects that reside in the set of databases;

said processor configured to receive a reference to an object that has a first object identifier, wherein said object is from said set of objects;

said processor configured to read a row-id from the reference;

said processor configured to read a second object identifier from a row that resides at a location identified by the row-id;

said processor configured to access the object from said row if the second object identifier matches said first object identifier; and said processor configured to search for a row that contains an object identifier that matches said first object identifier if the second object identifier does not match said first object identifier.

* * * * *